United States Patent [19]

Enke et al.

[11] Patent Number: 4,561,640
[45] Date of Patent: Dec. 31, 1985

[54] WHEEL SUSPENSION SYSTEM

[75] Inventors: Kürt Enke, Kirchheim; Achim Hespelt, Stuttgart; Eberhard Hertler, Filderstadt; Manfred von der Ohe, Stuttgart; Udo Saftien, Waiblingen, all of Fed. Rep. of Germany

[73] Assignee: Daimler-Benz Aktiengesellschaft, Fed. Rep. of Germany

[21] Appl. No.: 586,135

[22] Filed: Mar. 5, 1984

[30] Foreign Application Priority Data

Mar. 3, 1983 [DE] Fed. Rep. of Germany ....... 3307543

[51] Int. Cl.$^4$ ...................... B60G 11/16; B60G 15/06
[52] U.S. Cl. ............................... 267/20 A; 267/61 R; 280/666
[58] Field of Search ............ 267/8 R, 8 B, 8 C, 20 R, 267/20 A, 20 C, 60, 61 R, 61 S, 62, 166, 173, 174, 178, 179, 180; 280/666, 696, 701

[56] References Cited

U.S. PATENT DOCUMENTS

| | | | |
|---|---|---|---|
| 333,983 | 1/1886 | Vose | 267/61 R |
| 354,672 | 12/1886 | Barling | 267/180 X |
| 2,991,066 | 7/1961 | Fenton | 267/60 |

FOREIGN PATENT DOCUMENTS

| | | |
|---|---|---|
| 2431675 | 1/1976 | Fed. Rep. of Germany . |
| 2730323 | 2/1978 | Fed. Rep. of Germany . |
| 1573273 | 7/1969 | France . |
| 2069947A | 9/1981 | United Kingdom ................ 280/701 |

Primary Examiner—Bruce H. Stoner, Jr.
Assistant Examiner—Richard R. Diefendorf
Attorney, Agent, or Firm—Barnes & Thornburg

[57] ABSTRACT

In wheel suspensions of automotive vehicles, equipped with a wheel suspension system comprising a coil spring, a specific mutual association is required for functional reasons for the individual components of the wheel suspension, forcing constructional compromises in connection with the other structural conditions inherent in the design of the vehicle. In order to be able to avoid in such cases expensive compromise solutions, it is disclosed to have one or several vehicle components, to be correspondingly correlated with the coil spring, project in between turn portions of a spring turn that has a larger lead as compared with the regular lead of the coil spring, or pass such components through the expanded spring section of the coil spring.

25 Claims, 6 Drawing Figures

WHEEL SUSPENSION SYSTEM

BACKGROUND AND SUMMARY OF THE INVENTION

The invention relates to a wheel suspension for automotive vehicles, with at least one wheel control member and with the wheel suspension system comprising a coil spring and at least one vehicle component arranged in the surrounding area of the coil spring.

In wheel suspensions of this type, the space is frequently very restricted. However, in most cases a quite specific arrangement is desirble for the individual parts of the wheel suspension, for functional reasons. This oftentimes forces compromises in conjunction with the other constructional conditions resulting from the design of the vehicle.

Thus, for example, French Pat. No. 1,573,273 concerns a wheel suspension of this general type wherein the coil spring is in the way of the axle shaft and is therefore supported on the wheel control member by way of a special bracket bridging the axle shaft. Consequently, this construction requires a special bridging member, the manufacture and mounting of which cause additional expenses.

In another conventional wheel suspension, German Published Unexamined Application (DOS) No. 2,431,675, the coil spring of the spring leg is to be supported on the damper thereof above the vehicle wheel. This structural solution, however, requires a large construction height of the spring leg, counteracting, for example in case of front axles, the tendency of placing the contours of the engine hood increasingly lower.

Thus, a great variety of compromises have been made, namely in constructional as well as functional viewpoints (for example with respect to spring ratio), wherein corresponding problems are encountered precisely in connection with the arrangement of coil springs because these require a large amount of space.

Special difficulties evolve, of course, if an already designed vehicle is to be retrofitted, for example from rear wheel drive to front wheel drive or four wheel drive, or is to be equipped with coil springs of a different size for roadway and terrain.

Therefore, an object of the invention is to provide a wheel suspension of the type discussed hereinabove which permits a construction adaptable to a great variety of different requirements in an especially advantageous way.

This object is achieved by the invention by configuring the coil spring so that the vehicle component extends between turn sections of the coil spring, inside the envelope or axial projection of the adjacent outer circumference of the coils of the spring.

In the wheel suspension of this invention, the coil spring is accordingly expanded and extended past the area of a spring turn at the location where it would otherwise be in the way of a vehicle part to be arranged in its surrounding area. In advantageous preferred embodiments, the vehicle part is arranged with a partial section thereof within the projection of the spring coil circumference. In other preferred embodiments the vehicle part is arranged with its total cross section contained within the widened area of the spring. Preferred embodiments are comtemplated where the vehicle part completely penetrates through the coil spring and advantageously intersects the axis of the coil spring.

The extent of expansion of the spring is to be selected so that the turn portions looping around the respective vehicle component and pertaining to the spring turn which, as compared with the regular spring lead, is designed with a larger lead and/or is expanded, are at a lateral distance from the vehicle component ensuring that any contact between the spring turn portions and the vehicle component or components is excluded at the maximally possible spring stroke. In this connection, the coil spring can be arranged to be upright or in a horizontal position.

The term "regular lead of the coil spring" is to be understood to mean that either all spring turns of the coil spring have the same mutual spacing from turn to turn over the entire length of the spring, or that the lead between individual groups of spring turns is also changed in a predetermined manner over the length of the coil spring. Moreover, the coil spring can be fashioned according to preferred embodiments to be of a circular-cylindrical, truncated cone, barrel shape or as a spring with a reduced cross section.

The vehicle component can be any part to be accomodated in the region of a wheel suspension, and thus can be, for example, a part of the wheel control system, e.g. a strut or a control arm or, one or several pipelines, for example, exhaust pipes, an axle shaft, a body part, or a wheel.

Furthermore, various vehicle components can simultaneously be in engagement with the widened portion of the spring, or can pass entirely therethrough.

In certain preferred embodiments, the coil spring is constructed with only one spring turn at one end of the spring having the larger lead and a plurality of spring turns at the other end thereof. In the same way, spring turns can be arranged on both sides of the widened portion of the spring in an identical or in a different number. Thus, the zone of the coil spring exhibiting the spring expansion can be changed according to the invention, in dependence on the spatial correlation of the coil spring and the vehicle component(s).

In this connection, the structure of the coil spring offers an important advantage, according to certain embodiments, especially if the spring supporting surfaces assume an oblique mutual positioning during compression or lehgthening of the coil spring. In such a case, it is ensured that the coil spring can no longer be deformed (bulge) to an intolerable extent transversely to its longitudinal axis. In this connection, advantageous embodiments include coil springs designed with different flexural resilience or spring constant for the spring turns at the side of the vehicle component being circumvented.

Another advantageous embodiment of the invention includes an arrangement where the turn diameter of the spring turns, adjoining on both sides of the spring turn exhibiting the larger leads, are different from one another. This construction of the spring is advantageous if, for example, the installation space for arranging the coil spring is correspondingly restricted, and yet it is to ensured that the coil spring cannot be deformed unduly transversely to its longitudinal axis.

Furthermore, in view of the objectives of the invention, it is advantageous according to certain embodiments to select the wire diameter of the spring turns adjoining on both sides the spring turn with the larger lead to be differently large and/or to reduce, at least at one of the spring sections adjoining the widening of the spring, the diameter of the individual spring turns from one turn to the next in the direction of the supporting surface of this spring section.

Further objects, features, and advantages of the present invention will become more apparent from the following description when taken with the accompanying drawings which show, for purposes of illustration only, embodiments in accordance with the present invention.

DETAILED DESCRIPTION OF THE DRAWINGS

Figure 1:
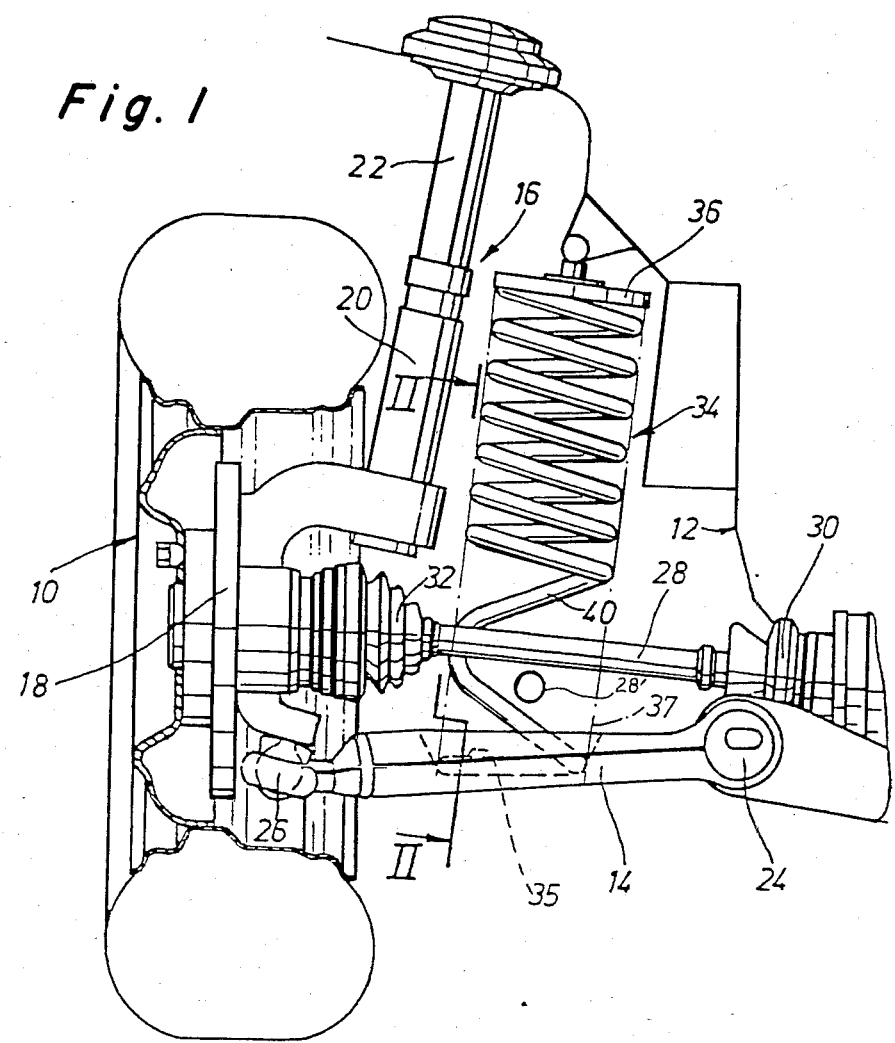
FIG. 1 is a schematic partial view of a first embodiment of a wheel suspension fashioned, for example, as an independent suspension, wherein the wheel is shown in a sectional view.

The independent wheel suspension shown in FIG. 1 serves, for example, for the support and control of a drivable rear wheel 10 of an automotive vehicle, conventionally guided at the vehicle body, denoted by 12 in its entirety, for example with the aid of a lower transverse control arm 14 and a damper leg 16, known per se.

For this purpose, a wheel carrier 18 supporting the rear wheel 10 is held nonrotationally in a manner known per se at the lower end of an external tube 20 of the damper leg 16, the piston rod 22 of this damper leg being elastically supported at the vehicle body 12.

The transverse control arm 14 is pivotably mounted, on the one hand, preferably with the interposition of a rubber element, in a joint 24 provided at the vehicle body 12 and, on the other hand, is articulated to the wheel carrier 18 by means of a ball joint 26.

The rear wheel 10 is driven by way of an axle shaft 28, arranged at a spacing above the transverse control arm 14 and extending transversely to the longitudinal axis of the vehicle; this axle shaft being provided conventionally with respectively one joint 30 and 32 on the side of the wheel and on the side of the drive assembly.

Number 32 denotes in its entirety a coil spring in the upright position which, as seen in the longitudinal direction of the vehicle, is arranged between the damper leg 16 and the joint 24 of the transverse control arm 14 on the vehicle body side, in such a way that the coil spring 50 covers, in top view, the axle shaft 28. The spring is supported with its bottom spring end, forming an at least partially annular-shape support 35, on the wheel control member constituted by the transverse control arm 14 and with its top end on the vehicle body 12. For this purpose, the vehicle body includes a preferably articulated supporting member 36 fashioned, for example, in the manner of a plate spring. The lower end of the coil spring is fixed at the transverse control arm 14, in a cup-shaped depression 38 in the radial direction. The coil spring 34, however, can also be directly supported at the vehicle body at the top according to other preferred embodiments. The axle shaft 28 accordingly passes through the enveloping surface (axial projection of the circumference of the spring turns), denoted by 37, of the coil spring.

The above-described arrangement of the coil spring 34 requires a feature to advantageously provide its lower support on the transverse control arm 14, without additional auxiliary means, with respect to a vehicle body part intersecting the coil spring, in this case, for example, in the form of the axle shaft 28. For this purpose, the lead of the spring winding of the coil spring 34 is enlarged in the penetrating zone of the axle shaft 28 through the coil spring in such a way that a coil turn 40 with its turn portions 40' and 40" is extended at a correspondingly large radial spacing around the axle shaft 28. This ensures that, with maximum inward and outward deflection of the rear wheel 10, there can be no contacting between the turn portions 40' and 40" of the spring turn 40 and the axle shaft 28. In a preferred alternative embodiment, the vehicle component may be an exhaust pipe 28' which traverses the coil spring without touching the coil spring portions 40' and 40".

Figure 2:
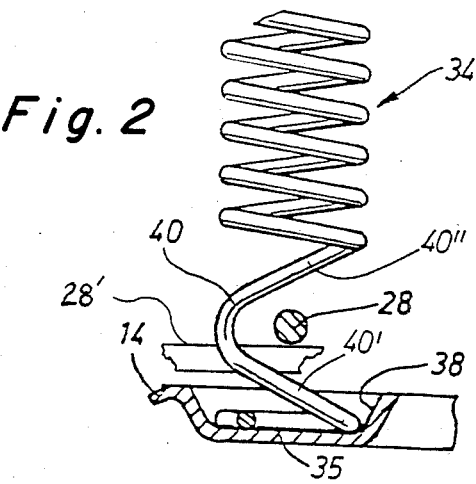
FIG. 2 is a sectional view along line II—II in FIG. 1.

As shown in FIG. 2, the mutual association of the coil spring 34 and the axle shaft 28 is preferably such that their axes intersect. Such a spatial correlation is also to be considered optimal for the case in which, for the resilient support of the vehicle body 12, the wheel suspension is to be equipped with two coil springs arranged coaxially one within the other; it is obvious in this instance that both coil springs must exhibit a turn of a larger lead in the penetrating zone of the axle shaft. In this case, the coil springs can be correlated with each other in such a way that the turns of these springs exhibiting the larger lead extend around the axle shaft 28 in the opposite orientation.

In the illustrated embodiment wherein the axle shaft 28 extends above and in close proximity to the transverse control arm 14, it can be sufficient, as illustrated, to have the steeper spring turn 40 directly supported on the transverse control arm 14 with the lower turn portion. This is applicable, in particular, if the maximally possible spring stroke is not designed excessively large, as is the case in sports or racing cars.

Figure 3:
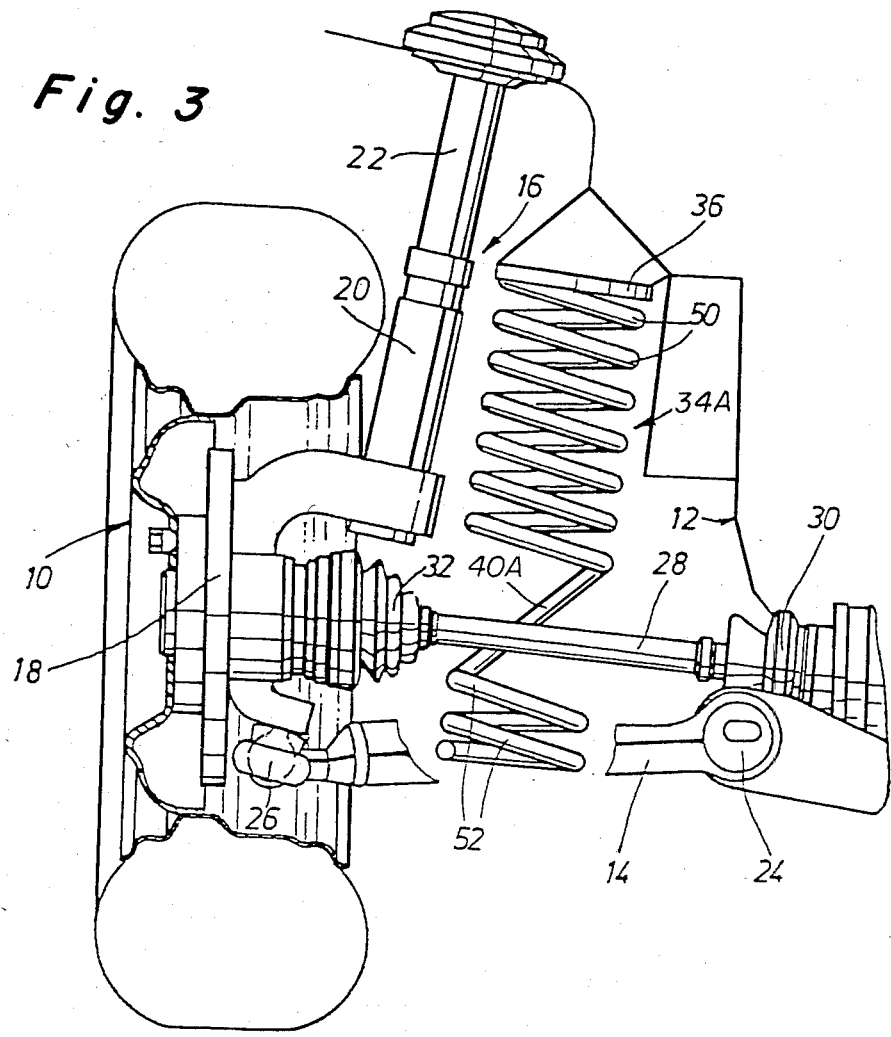
FIGS. 3–5 are illustrations of further embodiments of wheel suspensions similar to FIG. 1, differing from one another in the design of their coil springs.
Figure 4:
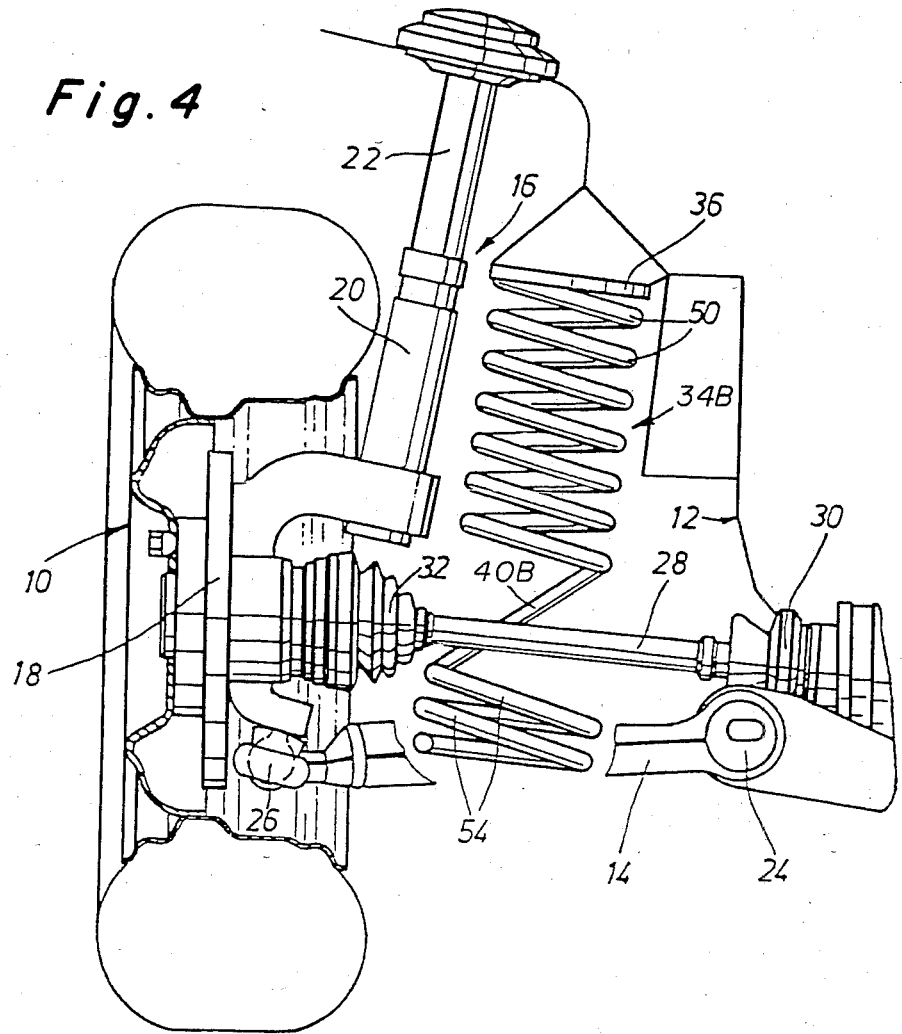
Figure 5:
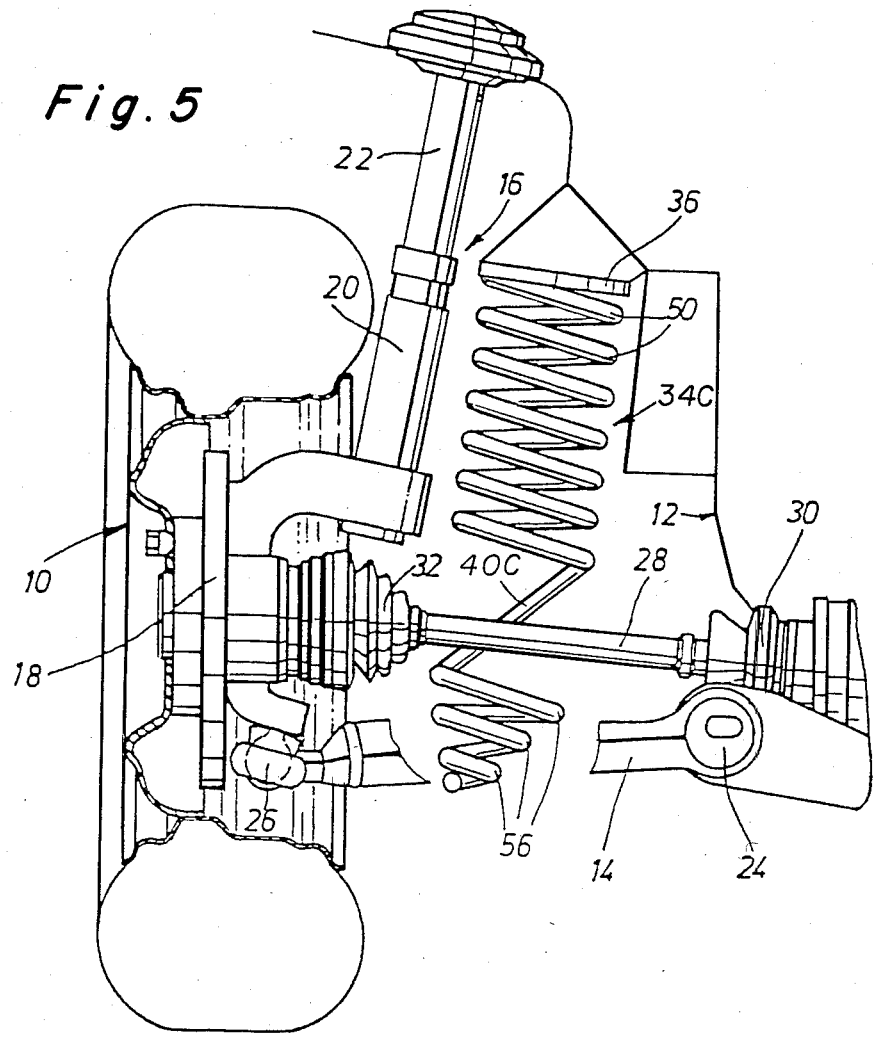

The wheel suspension shown in FIGS. 3–5 differ from the above-described wheel suspension merely with respect to the construction of their coil spring 34 (34A, B, . . . )

These different spring designs are suitable, for example, for wheel suspension wherein the transverse control arms 14 must execute relatively large, fixedly determined pivoting angles during bouncing and rebounding of the rear wheel 10. These spring arrangements prevent the spring section adjoining at the top of the correspondingly steeply extending spring turn 40A, which exhibits a plurality of spring turns 50 with identical lead, from bulging to a no longer tolerable extent transversely to the longitudinal side of the vehicle.

In order to achieve this objective, the steeply extending spring turn 40A in the embodiment according to FIG. 3 passes over at the bottom into an adjoining spring portion comprising, for example, two spring turns 52 and being supported on the transverse control arm 14. The lead of these spring turns 52 corresponds, for example, to that of the upper spring turns 50. This also holds true with respect to the diameters of the spring wire and the spring turns.

This lower spring section could, of course, also include only a single spring turn, or also more than two spring turns, depending upon the values to be provided for flexural resilience and rigidity of the coil spring in the transition zone between the lower spring section and the spring turn 40A, considering the given bending resistance of the spring wire and additional spring parameters. In this connection, the flexural resilience of the at least one lower spring turn is to be in all instances larger than that of the spring turn 40A which extends more steeply.

In the wheel suspension according to FIG. 4, the lower spring section of the coil spring 34B, supported on the transverse control arm 14, is also constituted, for example, by two spring turns 54 designed of a diameter larger than that of the spring turns 50 of the upper spring section.

Such a spring arrangement is especially advantageous if the installation space between the axle shaft 28 and the transverse control arm 14 is of narrow dimensions.

However, instead of enlarging the diameter of the lower spring turns 54, embodiments are contemplated where the spring wire of these turns is made smaller in diameter as compared with that of the upper spring turns 50.

In the wheel suspension of FIG. 5, the lower section of the coil spring 34C, supported on the transverse control arm 14 and including several spring turns 56, is fashioned toward the bottom in the manner of a truncated cone, whereby it is likewise possible to attain the flexural resilience of the coil spring 34C necessary between the transverse control arm 14 and/or between its spring-supporting base and the steep spring turn 40 C.

In analogy to the wheel suspensions according to FIGS. 3-5, an advantageous modification of the construction within the scope of this invention can also reside in that the steeply extending spring turn 40 (40A, B, . . . ) is supported with its upper end directly on part of the body and/or on the supporting member 36, and one or several spring turns are added merely at the lower end of this spring turn facing the wheel control member and/or transverse control arm 14.

It is likewise contemplated for the coil spring 34 (34A, B . . . ) to be penetrated, in place of the axle shaft 28, by one or even several other structural parts in the zone of a spring turn that must be correspondingly widened.

Figure 6:
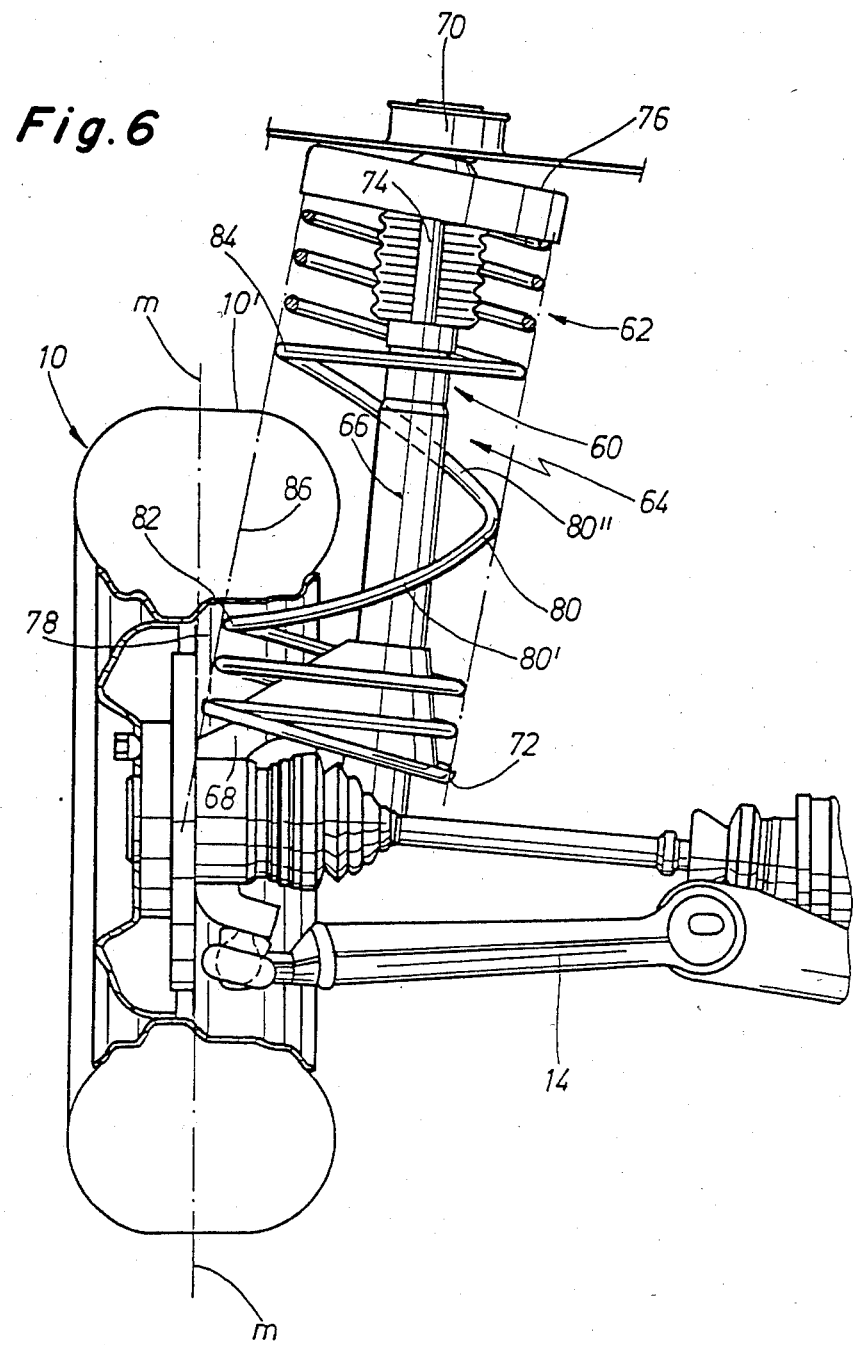
FIG. 6 is a rear view of an independent wheel suspension equipped with a spring leg in accordance with a still further embodiment of the invention.

The independent wheel suspension of FIG. 6 comprises as the wheel control members at the bottom, for example, a transverse control arm 14 and at the top a spring leg 64 constituted by a damper 60 and a coil spring 62, the wheel carrier 68 being rigidly attached at the bottom to the damper tube 66 thereof.

The spring leg 64 is moved into the close proximity of the wheel 10 and extends, for example, starting with its upper supporting site 70, obliquely toward the bottom and toward the outside.

The coil spring 62 surrounds the damper tube 66 essentially over the entire length of the latter, resting at the bottom on a flange 72 of the damper tube 66 whereas the spring is supported with its upper end on a flange 76 held on the piston rod 74.

In this arrangement, the coil spring 62 is provided with an even larger inclination with respect to the wheel center plane m—m than the damper so that the lower end of the spring is correspondingly fixed eccentrically with respect to the damper sleeve 66 and projects, as seen from the rear side of the wheel, considerably into the inner space 78 of the wheel.

Such a spring arrangement is possible only, because the coil spring 62 exhibits a correspondingly expanded spring turn 80 at the location of the upper wheel portion 10′, the turn portions 80′, 80″ of this turn extending around this wheel portion 10′ in such a way that the lower turn portion 80′ lies with its beginning 82 in closer proximity to the wheel center plane m—m than the end 84 of the upper portion 80″ passing over into the upper spring section.

Accordingly, the invention provides, in case of damper legs, a novel and especially advantageous spring arrangement because it is possible by the widened section of the spring from the upper wheel part 10′ to penetrate with a portion of its cross section the circular-cylindrical enveloping surface 86 of the spring and/or to project into the coil spring 62.

This construction thus permits, inter alia, a considerable reduction of the overhang of the damper leg 64 past the wheel 10.

The spring leg 64 could also be associated with the wheel 10 in such a way that the enveloping surface 86 of the spring extends essentially in parallel to the wheel center plane m—m according to other contemplated preferred embodiments of the invention.

Further, the invention makes it possible to build a wheel suspension with a damper leg wherein, analogously to the construction of DOS No. 2,730,323, the coil spring as seen in the driving direction is located in front of or behind the damper leg and is supported at the bottom, especially at least over part of its cross section, within the inner space of the wheel on the wheel carrier.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Wheel suspension arrangement for automotive vehicles comprising at least one wheel control member, and a wheel suspension system including a coil spring and with at least one vehicle component arranged in the surrounding area of the coil spring, wherein the vehicle component penetrates an axial projection of the coil spring coil turn circumference between two spring turn sections of a spring turn exhibiting a larger lead as compared with a regular lead of the coil spring, wherein the vehicle component is an axle shaft.

2. Wheel suspension arrangement for automotive vehicles comprising at least one wheel control member, and a wheel suspension system including a coil spring and with at least one vehicle component arranged in the surrounding area of the coil spring, wherein the vehicle component penetrates an axial projection of the coil spring coil turn circumference between two spring turn sections of a spring turn exhibiting a larger lead as compared with a regular lead of the coil spring, wherein the vehicle component is a vehicle body part.

3. Wheel suspension arrangement for automotive vehicles comprising at least one wheel control member, and a wheel suspension system including a coil spring and with at least one vehicle component arranged in the surrounding area of the coil spring, wherein the vehicle component penetrates an axial projection of the coil spring coil turn circumference between two spring turn sections of a spring turn exhibiting a larger lead as compared with a regular lead of the coil spring, wherein the vehicle component is a vehicle wheel.

4. An arrangement according to claim 3, wherein part of the coil spring lies within a wheel recess.

5. Wheel suspension arrangement for automotive vehicles comprising at least one wheel control member, and a wheel suspension system including a coil spring and with at least one vehicle component arranged in the surrounding area of the coil spring, wherein the vehicle component penetrates an axial projection of the coil spring coil turn circumference between two spring turn sections of a spring turn exhibiting a larger lead as compared with a regular lead of the coil spring, wherein the vehicle component is a damper assembly of a wheel control system, with the axis of the coil spring inclined with respect to the axis of the damper assembly.

6. Coil spring arrangement for a vehicle wheel suspension system of the type having:
   a wheel control member, and
   a wheel suspension system including a coil spring means and a vehicle component disposed adjacent said coil spring means, said coil spring arrangement comprising:
   more than two spring turns in said coil spring means, wherein said spring means is configured to permit said vehicle component to penetrate between two of said spring turns into the area of an axial projection of said coil spring means, while also preventing said component from touching said spring turns as said vehicle component traverses therethrough even during maximum inward and outward deflection of said coil spring means,
   whereby said vehicle component can extend uninterrupted through said axial projection of said spring means.

7. An arrangement according to claim 6, wherein each of said spring turns includes a pair of spring turn sections, wherein two of said spring turn sections form a spring turn having a larger lead as compared with a regular lead of the remaining spring turns of said coil spring means.

8. An arrangement according to claim 7, wherein the vehicle component extends at a right angle to the axis of the coil spring means and with only a partial section of the vehicle component located between the spring turn sections of the spring turn having the larger lead.

9. An arrangement according to claim 7, wherein the vehicle component extends transversely through the coil spring means, in between the spring turn sections of said spring turn having the larger lead.

10. An arrangement according to claim 9, wherein the vehicle component intersects the axis of the coil spring.

11. An arrangement, according to claim 7, wherein at least one further spring turn adjoins each side of the spring turn hving the larger lead.

12. An arrangement according to claim 11, wherein the spring turns adjoining each side of the spring turn having the larger lead have different flexural resiliences.

13. An arrangement according to claim 12, wherein the spring turns adjoining each side of the spring turn having the larger lead have different turn diameters.

14. An arrangement according to claim 11, wherein the spring turns adjoining each side of the spring turn exhibiting the larger lead, have different turn diameters.

15. An arrangement according to claim 7, wherein said coil spring means having a spring turn with a larger lead forms, with one of its ends, at least a partially annular-type spring support.

16. An arrangement according to claim 15, wherein the spring support is fixed at least in the radial direction on the wheel control member.

17. An arrangement according to claim 7, wherein said vehicle component penetrates through said spring turn sections forming a spring turn having said larger lead.

18. An arrangement according to claim 17, wherein the vehicle component is an axle shaft.

19. An arrangement according to claim 17, wherein the vehicle component is a vehicle body part.

20. An arrangement according to claim 17, wherein the vehicle component is part of a wheel control system.

21. An arrangement according to claim 17, wherein the vehicle component is a vehicle wheel.

22. An arrangement according to claim 21, wherein part of the coil spring means lies within a wheel recess.

23. An arrangement according to claim 17, wherein the vehicle component is a damper assembly of a wheel control system.

24. An arrangement according to claim 23, wherein the axis of the coil spring means is inclined with respect to the axis of the damper assembly.

25. An arrangement according to claim 17, wherein the vehicle component is a pipeline, such as an exhaust pipe.

* * * * *